US011113181B2

(12) United States Patent
Cook et al.

(10) Patent No.: US 11,113,181 B2
(45) Date of Patent: Sep. 7, 2021

(54) DEBUGGING A LIVE STREAMING APPLICATION

(71) Applicant: International Business Machines Corporation, Armonk, NY (US)

(72) Inventors: Alexander Cook, London (GB); David M. Koster, Reston, VA (US); Jason A. Nikolai, Rochester, MN (US); Alexander J. Pogue, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 40 days.

(21) Appl. No.: 16/454,051

(22) Filed: Jun. 27, 2019

(65) Prior Publication Data

US 2019/0317883 A1   Oct. 17, 2019

Related U.S. Application Data

(63) Continuation of application No. 15/344,070, filed on Nov. 4, 2016, now Pat. No. 10,353,802.

(51) Int. Cl.
*G06F 11/00* (2006.01)
*G06F 11/36* (2006.01)
*G06F 11/32* (2006.01)

(52) U.S. Cl.
CPC ........ *G06F 11/3644* (2013.01); *G06F 11/323* (2013.01); *G06F 11/3624* (2013.01);
(Continued)

(58) Field of Classification Search
CPC .. G06F 11/36; G06F 11/3624; G06F 11/3628; G06F 11/3664
See application file for complete search history.

(56) References Cited

U.S. PATENT DOCUMENTS 6,003,143 A * 12/1999 Kim ...................... G06F 11/323
706/46
8,255,203 B2   8/2012 George et al.
(Continued)

OTHER PUBLICATIONS

"Omnicore Pioneers Back-In-Time Debugging in Their Java IDE CodeGuide 7," [online] PR Newswire, Omnicore Software GbR, Mar. 16, 2004 [retrieved Nov. 4, 2016], retrieved from the Internet: <http://www.prnewswire.com/news-releases/omnicore-pioneers-back-in-time-debugging-in-their-java-ide-codeguide-7-72085897.html>, 2 pg.

(Continued)

*Primary Examiner* — Philip Guyton
(74) *Attorney, Agent, or Firm* — Cuenot, Forsythe & Kim, LLC

(57) ABSTRACT

A connection can be made to a processing element of a remotely deployed and live streaming application executed by a first data processing system, the processing element containing at least one operator that processes at least one tuple. As the live streaming application is executed, without slowing or modifying data flow of the live streaming application execution to client devices, a copy of the tuple and a memory dump of state data for a state of the operator can be received, and the tuple can be tracked through a call graph. The state data can be loaded into a local instance of the operator loaded into a debugger. At least a portion of the call graph can be presented to a user, and a flow of the tuple through the call graph based on the state data for the operator can be indicated.

20 Claims, 3 Drawing Sheets

(52) U.S. Cl.
CPC ...... *G06F 11/3628* (2013.01); *G06F 11/3656* (2013.01); *G06F 11/3664* (2013.01)

(56) References Cited

U.S. PATENT DOCUMENTS

| | | | |
|---|---|---|---|
| 8,359,584 | B2 | 1/2013 | Rao et al. |
| 8,595,709 | B2 | 11/2013 | Rao et al. |
| 8,930,923 | B2 | 1/2015 | Alanis |
| 9,098,627 | B2 | 8/2015 | Klic et al. |
| 9,158,661 | B2 | 10/2015 | Blaine et al. |
| 10,353,802 | B2 * | 7/2019 | Cook ............... G06F 11/3664 |
| 2002/0087950 | A1 | 7/2002 | Brodeur et al. |
| 2003/0061600 | A1 | 3/2003 | Bates |
| 2004/0111707 | A1 | 6/2004 | Bliss et al. |
| 2011/0225459 | A1 | 9/2011 | Fahrig et al. |
| 2012/0159444 | A1 | 6/2012 | Agarwal et al. |
| 2014/0215443 | A1 | 7/2014 | Voccio |
| 2015/0121145 | A1 | 4/2015 | Mahajan et al. |
| 2016/0098326 | A1 | 4/2016 | Rebello et al. |
| 2016/0124834 | A1 * | 5/2016 | Davis ............... G06F 11/3676 712/227 |
| 2018/0129582 | A1 | 5/2018 | Cook et al. |

OTHER PUBLICATIONS

"Omniscient Debugging," [online] Dr. Dobb's, The World of Software Development, Jun. 1, 2005 [retrieved Nov. 4, 2016], retrieved from the Internet: <http://www.drdobbs.com/tools/omniscient-debugging/184406101>, 3 pg.

"RetroVue 1.1 from VisiComp, World's First Total Recall Debugger for Java Programming Language" [online] System News, Vo. 53, No. 5, Art. 7277, Jul. 29, 2002 [retrieved Nov. 4, 2016], retrieved from the Internet: <http://sun.systemnews.com/printerfriendly?article=7277>, 1 pg.

Lewis, B., "Omniscient DeBugging, Because the Debugger Knows Everything," [online] Feb. 18, 2007 [retrieved Nov. 4, 2016] retrieved from the Internet: <http://www.cs.kent.edu/~farrell/mc08/lectures/progs/pthreads/Lewis-Berg/odb/debugger.html>, 3 PG.

Corley, J., "Exploring Omniscient Debugging for Model Transformation," [online] Dept. of Computer Science, University of Alabama, [retrieved Nov. 4, 2016] retrieved from the Internet: <http://ceur-ws.org/Vol-1258/src3.pdf>, 6 pg.

Corley, J. et al., "Towards Efficient and Scalable Omniscient Debugging for Model Transformations," [online] In Proc. of 14th Workshop on Domain-Specific Modeling, pp. 13-18, ACM, 2014 [retrieved Nov. 4, 2016] retrieved from the Internet: <http://www.dsmforum.org/events/DSM14/Papers/Corley.pdf>, 6. pg.

Terashima, Y et al., "Static Call Graph Generator for C++ Using Debugging Information," In IEEE 14th Asia-Pacific Software Engineering Conference (APSEC'07), Dec. 4, 2007, pp. 127-134).

"Global Snapshots For Distributed Debugging," IP.com Prior Art Database Technical Disclosure No. IPCOM000245647D, Mar. 24, 2016, 15 pg.

* cited by examiner

200

```
┌─────────────────────────────────────────────────────────────────────────┐
│ Generate a call graph from source code of a streaming application by    │
│ performing a static analysis on the source code                         │
│ 202                                                                     │
└─────────────────────────────────────────────────────────────────────────┘
                                     ↓
┌─────────────────────────────────────────────────────────────────────────┐
│ Deploy the live streaming application by a first data processing system │
│ and go live with the streaming application                              │
│ 204                                                                     │
└─────────────────────────────────────────────────────────────────────────┘
                                     ↓
┌─────────────────────────────────────────────────────────────────────────┐
│ Remotely connect to a processing element of the live streaming          │
│ application                                                             │
│ 206                                                                     │
└─────────────────────────────────────────────────────────────────────────┘
                                     ↓
┌─────────────────────────────────────────────────────────────────────────┐
│ Hook a processing thread of the live streaming application used for     │
│ execution of the processing element                                     │
│ 208                                                                     │
└─────────────────────────────────────────────────────────────────────────┘
                                     ↓
┌─────────────────────────────────────────────────────────────────────────┐
│ As the live streaming application is executed, without slowing or       │
│ modifying data flow of the live streaming application execution to      │
│ client devices, receive a copy of the tuple and a memory dump of state  │
│ data for a state of the at least one operator while operating on the    │
│ tuple, and track the tuple through a call graph comprising at least one │
│ node representing the at least one operator                             │
│ 210                                                                     │
└─────────────────────────────────────────────────────────────────────────┘
                                     ↓
┌─────────────────────────────────────────────────────────────────────────┐
│ Loading, into a debugger hosted on a second data processing system, the │
│ state data for the state of the at least one operator into a local      │
│ instance of the operator loaded into the debugger by moving or copying  │
│ the state data into at least one location in memory used by the local   │
│ instance of the operator                                                │
│ 212                                                                     │
└─────────────────────────────────────────────────────────────────────────┘
                                     ↓
┌─────────────────────────────────────────────────────────────────────────┐
│ Present, by the debugger, to a user at least a portion of the call      │
│ graph comprising the at least one node, and indicating to the user a    │
│ flow of the tuple through at least the portion of the call graph based  │
│ on the state data for the operator                                      │
│ 214                                                                     │
└─────────────────────────────────────────────────────────────────────────┘
```

FIG. 2

DEBUGGING A LIVE STREAMING APPLICATION

BACKGROUND

The present invention relates to data processing, and more specifically, to debugging computer programs.

Debugging is the process of finding and resolving defects that prevent correct operation of a computer program. The difficulty of debugging computer programs varies greatly depending on the complexity of the system being debugged, and debugging complex computer programs can be very difficult. Accordingly, debuggers commonly are used to facilitate the debugging process. Debuggers are software tools which enable a software developer to monitor the execution of a program for debugging purposes.

SUMMARY

A method includes connecting to a processing element of a remotely deployed and live streaming application executed by a first data processing system, the processing element containing at least one operator that processes at least one tuple. The method also can include hooking at least one processing thread of the live streaming application used for execution of the processing element. The method also can include, as the live streaming application is executed, without slowing or modifying data flow of the live streaming application execution to client devices, receiving a copy of the tuple and a memory dump of state data for a state of the at least one operator while operating on the tuple, and tracking the tuple through a call graph comprising at least one node representing the at least one operator. The method also can include, in a debugger hosted on a second data processing system that is remote to the first data processing system, loading, using a processor, the state data for the state of the at least one operator into a local instance of the operator loaded into the debugger by moving or copying the state data into at least one location in memory used by the local instance of the operator. The method also can include, presenting, by the debugger, to a user at least a portion of the call graph comprising the at least one node, and indicating to the user a flow of the tuple through at least the portion of the call graph based on the state data for the operator.

A system includes a processor programmed to initiate executable operations. The executable operations include connecting to a processing element of a remotely deployed and live streaming application executed by a first data processing system, the processing element containing at least one operator that processes at least one tuple. The executable operations also can include hooking at least one processing thread of the live streaming application used for execution of the processing element. The executable operations also can include, as the live streaming application is executed, without slowing or modifying data flow of the live streaming application execution to client devices, receiving a copy of the tuple and a memory dump of state data for a state of the at least one operator while operating on the tuple, and tracking the tuple through a call graph comprising at least one node representing the at least one operator. The executable operations also can include, in a debugger hosted on a second data processing system that is remote to the first data processing system, loading the state data for the state of the at least one operator into a local instance of the operator loaded into the debugger by moving or copying the state data into at least one location in memory used by the local instance of the operator. The executable operations also can include, presenting, by the debugger, to a user at least a portion of the call graph comprising the at least one node, and indicating to the user a flow of the tuple through at least the portion of the call graph based on the state data for the operator.

A computer program includes a computer readable storage medium having program code stored thereon. The program code is executable by a processor to perform a method. The method includes connecting, by the processor, to a processing element of a remotely deployed and live streaming application executed by a first data processing system, the processing element containing at least one operator that processes at least one tuple. The method also can include hooking, by the processor, at least one processing thread of the live streaming application used for execution of the processing element. The method also can include, as the live streaming application is executed, without slowing or modifying data flow of the live streaming application execution to client devices, receiving, by the processor, a copy of the tuple and a memory dump of state data for a state of the at least one operator while operating on the tuple, and tracking the tuple through a call graph comprising at least one node representing the at least one operator. The method also can include, in a debugger hosted on a second data processing system that is remote to the first data processing system, loading, by the processor, the state data for the state of the at least one operator into a local instance of the operator loaded into the debugger by moving or copying the state data into at least one location in memory used by the local instance of the operator. The method also can include, presenting, by the debugger, to a user at least a portion of the call graph comprising the at least one node, and indicating to the user a flow of the tuple through at least the portion of the call graph based on the state data for the operator.

BRIEF DESCRIPTION OF THE DRAWINGS

FIG. 2 is a flow chart illustrating an example of a method of debugging a live streaming application.

DETAILED DESCRIPTION

Figure 1:
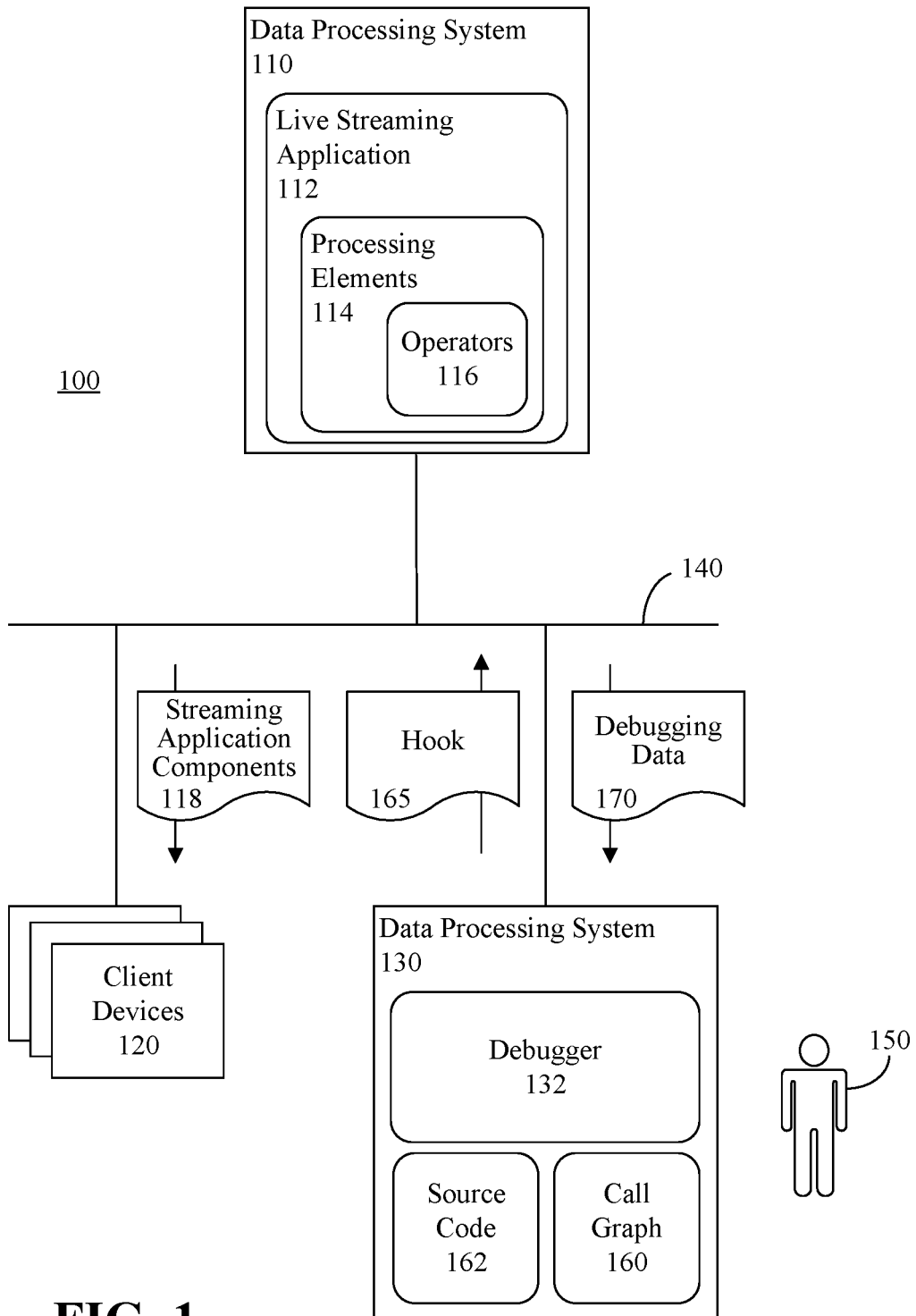
FIG. 1 is a block diagram illustrating an example of a network computing environment.

This disclosure relates to data processing, and more specifically, to debugging computer programs. In accordance with the inventive arrangements disclosed herein, debugging data can be gathered from a live streaming application. The debugging data can include, for example, tuples operated upon in the live streaming application and state data for a state of at least one operator while operating on the tuple, and track the tuple through a call graph comprising at least one node representing the at least one operator. A debugger can load the state data for the at least one operator into a local instance of the operator loaded into the debugger. For example, the debugger can move or copy the state data into at least one location in memory used by the local instance of the operator. Further, the debugger can present to a user at least a portion of the call graph, and indicate to the user a flow of the tuple through the call graph based on the state data for the operator.

Several definitions that apply throughout this document now will be presented.

As defined herein, the term "streaming application" means a computer program that downloads necessary components of the computer program to data processing systems as needed rather than the necessary components being installed on the data processing systems a priori.

As defined herein, the term "live streaming application" means a streaming application deployed to, and currently executing on, a data processing system (e.g., production server) in a production environment and providing services/functionality to client devices not being used for purposes of developing and/or debugging the streaming application. In addition to the live streaming application providing services/functionality to such client devices, in accordance with arrangements described herein, a data processing system executing a debugger being used to debug the streaming application also can collect debugging information from the live streaming application without interfering with the live streaming application providing services/functionality to the client devices.

As defined herein, the term "debugger" means a software tool (e.g., an application) including software functions used by a software developer to debug a computer program.

As defined herein, the term "processing element" means a process (e.g., a container) that contains one or more operators.

As defined herein, the term "operator" means a self-contained function that performs at least one operation on one tuple at a time, and which can be executed independent of any other functions.

As defined herein, the term "tuple" means an ordered set of one or more elements (e.g., values). A tuple may be referred to as an n-tuple (e.g., "1-tuple," "2-tuple," "3-tuple," "4-tuple," and so on) where n indicates a number of elements contained in the ordered set of elements. In illustration, the ordered set of elements (5) is an example of a 1-tuple because it has one element, and the ordered set of elements (5, 9, 13, 23, 27, 29) is an example of a 6-tuple because it has six elements.

As defined herein, the term "call graph" means a functional data structure, including nodes and edges, which represents calling relationships between functions in a computer program. Each node of a call graph represents a function and each edge of a call graph indicates a function call. In illustration, if function "a" calls function "b," a call graph can represent functions "a" and "b" as respective nodes, and the call graph can represent the call of function "b" by function "a" as an edge connecting the respective nodes.

As defined herein, the term "memory dump," when used as a noun, means data retrieved from memory of a data processing system that comprises state data for an operator. As defined herein, the term "memory dump," when used as a verb, means to retrieve from memory of a data processing system data comprising state data for an operator.

As defined herein, the term "client device" means a processing system including at least one processor and memory that requests shared services from a server, and with which a user directly interacts. Examples of a client device include, but are not limited to, a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television and the like. Network infrastructure, such as routers, firewalls, switches, access points and the like, are not client devices as the term "client device" is defined herein. A data processing system executing a debugger being used to collect debugging information from a live streaming application in order to debug the live streaming application is not a client device as the term "client device" is defined herein.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "real time" means a level of processing responsiveness that a user or system senses as sufficiently immediate for a particular process or determination to be made, or that enables the processor to keep up with some external process.

As defined herein, the term "automatically" means without user intervention.

As defined herein, the term "user" means a person (i.e., a human being).

FIG. 1 is a block diagram illustrating an example of a network computing environment 100. The network computing environment 100 can include at least one data processing system 110 on which a live streaming application 112 is deployed, a plurality of client devices using the live streaming application 112, and a data processing system 130 used to debug the live streaming application 112. The client devices 120 and data processing system 130 can be communicatively linked to the data processing system 110 via at least one network 140. The network 140 is the medium used to provide communications links between various devices and data processing systems connected together within network computing environment 100. The network 140 may include connections, such as wire, wireless communication links, or fiber optic cables. The network 140 can be implemented as, or include, any of a variety of different communication technologies such as a WAN, a LAN, a wireless network, a mobile network, a Virtual Private Network (VPN), the Internet, the Public Switched Telephone Network (PSTN), or similar technologies.

The streaming application 112 can include a plurality of processing elements 114, each including one or more operators 116. The data processing system 110 can provide components 118 of the deployed streaming application 112 to the client devices 120 on an as needed basis, as is known to those or ordinary skill in the art of streaming applications. Each streaming application component 118 can include, for example, client side modules configured to be executed by the client devices 120 to interface with the streaming application 112. Accordingly, rather than downloading all streaming application components 118 to each of the client devices 120, the data processing system 110 can download to respective client devices 120 only the streaming application components 118 required by those client devices 120, thus conserving networking, data processing system and client device resources.

The data processing system 130 can include a debugger 132. The data processing system 130 can execute the debugger 132, for example at the behest of a user (e.g., a software developer) to debug the live streaming application 112. Notably, the debugger 132 can be used to debug the live streaming application 112 while the live streaming application 112 is deployed, and continues to execute on the data processing system 110 and provide services/functionality to the client devices 120.

In operation, the data processing system 130 can, using the debugger 132 or another application, can generate a call graph 160 for the streaming application 112 by processing source code 162 for the streaming application 112. The data processing system 130 can generate the call graph 160 during debugging operations or prior to commencement of debugging operations. In another arrangement, the data processing system 130 can access the call graph 160 from another system. For example, the data processing system 130 can access a call graph 160 previously generated for a current version of the live streaming application 112. The data processing system 130, or another data processing system, can generate the call graph 160 by performing a static analysis on the source code 162, as is known to those of ordinary skill in the art.

During debugging operations, the debugger 132 can connect to one or more processing elements 114 of the live streaming application 112 and collect debugging data 170. The debugging data can include, for example, a tuple being operated upon by one or more of the operators 116 and operating state data for such operators 116, for example a memory dump of the operator state data. Using the debugging data 170, the debugger 132 can identify potential nodes in the call graph 160 representing operators 116 that perform operations on a particular tuple during a specific window (e.g., time period) of process execution in the live streaming application 112, and determine all variables for the tuple that derive their state from such operations. The above operations, as well as additional operations, are described in further detail below.

FIG. 2 is a flow chart illustrating an example of a method 200 of debugging a live streaming application 112. At step 202, the data processing system 130 (e.g., the debugger 132, or another data processing system, can generate a call graph 160 from source code 162 of a live streaming application 112 by performing a static analysis on the source code 162. The call graph facilitates the use of minimal debugging data 170 extracted from the live streaming application 112 in order to debug the live streaming application 112. More particularly, the debugging data 170 need only represent one or more tuples of interest, or tuples being operated upon by one or more operators of interest, and operating state data for operators 116 that operate on the tuples. Nonetheless, additional debugging data 170 can be gathered if a user 150 performing debugging operations so desires.

At step 204, the data processing system 110 can deploy the streaming application 112 and go live with the streaming application. Accordingly, the client devices 120 (e.g., users of the client devices 120) can begin using the live streaming application 112, and the live streaming application 112 can stream application components 118 to the client devices 120. In one arrangement, the data processing system 110 can receive from another data processing system a compiled version of the streaming application 112, and deploy the compiled version.

At step 206, the debugger 132 can remotely connect to a processing element 114 of the live streaming application 112. As noted, the processing element 114 can include one or more operators that process at least one tuple. To connect to the processing element 114, the debugger 132 can communicate to the live streaming application 112 a connection request indicating the processing element 114 to which the debugger requests connection. The live streaming application 112 can be configured to process the request to connect the debugger 132 to the requested processing element 114.

At step 208, the debugger 132 can hook a processing thread of the live streaming application 112 used for execution of the processing element 114, for instance a main processing thread for the processing element 114, using techniques known in the art. In illustration, the debugger 132 can communicate to the data processing system 110 a hook 165 configured to be executed by the data processing system 110 to monitor one or more threads of the live streaming application 112, and copy tuples and state data for operators 116 of the processing element 114 that perform operations on the tuples.

At step 210, as the live streaming application 112 is executed, without slowing or modifying data flow of the live streaming application execution 112 to client devices, the debugger 132 can receive a copy of the tuple and a memory dump of state data for a state of the at least one operator while operating on the tuple. Using this information, the debugger 132 can track the tuple through a call graph comprising at least one node representing the at least one operator.

In illustration, as tuples are processed by the processing element 114, the hook 165 can, in real time, perform a memory dump for each operator 116 of the processing element 114 that operates on the tuples. Each operator can operate on one tuple at a time, and the hook 165 can perform a memory dump for each such operation. A memory dump can include all parameters and non-final variables used by an operator 116 for a respective operation on a tuple. Responsive to the hook 165 retrieving a memory dump for an operation, the data processing system 110 can communicate to the data processing system 130, for example to the debugger 132, the tuple being operated on, an identifier indicating the operator 116 performing the operation, and the memory dump for that operator 116 while performing the operation. Such information can be communicated to the data processing system 130, in real time, as debugging data 170. The debugger 132 can create an association between the memory dump and an index in the call graph 160, which allows the debugger 132 to track the tuple through the call graph 160. These processes can be repeated for each operation performed on a tuple until the tuple is communicated to a next processing element 114.

At step 212, the debugger 132 can load, in real time, the state data for the state of the at least one operator 116 into a local instance of the operator 116 loaded into the debugger 132 by moving or copying the state data into at least one location in memory used by the local instance of the operator 116. In illustration, the source code 162 can be loaded into the debugger 132. For each operator 116 in live streaming application 112 for which operator state data was gathered, the operator state data can be moved or copied to a respective memory location for an instance of that same operator 116 in the source code 162.

At step 214, the debugger 132 can present to the user 150, for example via a display, at least a portion of the call graph 160 comprising the at least one node, and indicate to the user a flow of the tuple through at least the portion of the call graph based on the state data for the operator. In this regard, the debugger 132 can use the state data for the operators 116 to perform a reconstruction of the processing element 114 representing the state of the processing element 114 while processing a tuple, and the user can step through the reconstruction without the reconstruction environment halting or timing out.

In illustration, the debugger 132 can present a portion of the call graph 160 containing nodes representing the operators 116 in a processing element 114 that was hooked. In another arrangement, the user 150 can enter one or more user inputs specifying at least one specific operator 116 in which the user is interested in debugging, and the debugger 132 can present a portion of the call graph 160 containing a node representing that operator 116 and nodes representing other operators connected to that operator by edges. In a further arrangement, the user 150 can enter one or more user inputs specifying at least one specific tuple, or at least one type of tuple, in which the user is interested, and the debugger 132 can present a portion of the call graph 160 containing nodes representing operators 116 used to process the specified tuples.

The call graph 160 (or portion thereof) presented to the user 150 in the debugger 132 can represent the operating state of the tuples and operators 115 as of the time the debugging data 170 was collected. The debugger 132 can be configured to receive inputs from the user 150 to step through nodes of the call graph 160 and inspect parameters and variables of various operators represented by the nodes. In illustration, the state of the presented call graph 160 can begin in a state just prior to a particular tuple being operated on by a first operator 116 of the processing element 114. The user 150 can inspect the state of the operator 116 and any other operators in the processing element 114. The user 150 then can enter a user input to initiate the operator to perform an operation on the tuple, and the user 150 can inspect the resulting state of the operator. The user then can enter another user input to initiate a next operator to perform an operation on the tuple, inspect the resulting operating state, and so on. Thus, the user 150 can step through the call graph 160 to follow the tuple through the same flow the tuple took in the live streaming application 112. In illustration, assuming the tuple flowed through specific operators 116 in the live streaming application 112, in the reconstruction of the processing element 114 in the debugger 132 the tuple can flow through local instances of those same operators 116.

Further, the debugger 132 can receive one or more user inputs from the user 150 changing a tuple and/or state data for one or more operators 116. Again, the user 150 can enter user inputs to step through nodes of the call graph 160 and inspect parameters and variables of various operators represented by the nodes. Thus, the user 150 can examine effects resulting from the tuple and/or state data changes during execution. In some cases, one or more changes to a tuple and/or state data may cause a different flow of the tuple through at least a portion of the call graph. The debugger 132 can indicate the different flow. For example, with a first tuple value, the tuple may flow from a first node to a second node, but with a second tuple value the tuple may flow from the first node to a second node. This new flow can be indicated as the user 150 steps through the call graph 160 with the new value assigned to the tuple.

In some instances, the debugger 132 may determine that additional data is required to accurately indicate the different flow of the tuple through at least the portion of the call graph 160 resulting from the user input. In such instances, the debugger 132 can analyze the tuple and/or operator state data for the operators 116 through which the tuple passed and, based on such analysis, generate at least one assumption and/or assertion regarding the different flow of the tuple through at least the portion of the call graph 160.

For example, assume that in the live streaming application 112 the tuple proceeded from a first operator to a second operator, but did not proceed to a third operator. Since the tuple did not proceed to the third operator, the debugging data 170 may not contain operator state data for that third operator. Further assume that changes made by the user 150 to the tuple value and/or state data for the first operator causes the tuple to proceed from the first operator to the third operator. In such case, the debugger 132 can generate assumption about the operator state data for that third operator. In illustration, if the third operator performs an operation of persisting a value to a database, responsive to the tuple proceeding to the third operator in the reconstruction of the processing element 114, the debugger 132 can generate an assumption that the value is successfully persisted to the database, and update the operator state of the third operator accordingly.

In a variant of the above example, assume that the third operator performs an operation comparing the tuple to a value received from a database. Since in the live streaming application 112 the tuple did not proceed to the third operator, the debugging data 170 may not contain operator state data for that third operator indicating the value received from the database. Nonetheless, the debugger 132 can generate an assertion regarding the value, for example the tuple matched the value or the tuple did not match the value. In a further arrangement, the debugger 132 can present to the user 150 a list of potential assertions, and from that list the user 150 can select an assertion. The debugger 132 can generate operator state data for the third operator to implement the user selected assertion.

Figure 3:
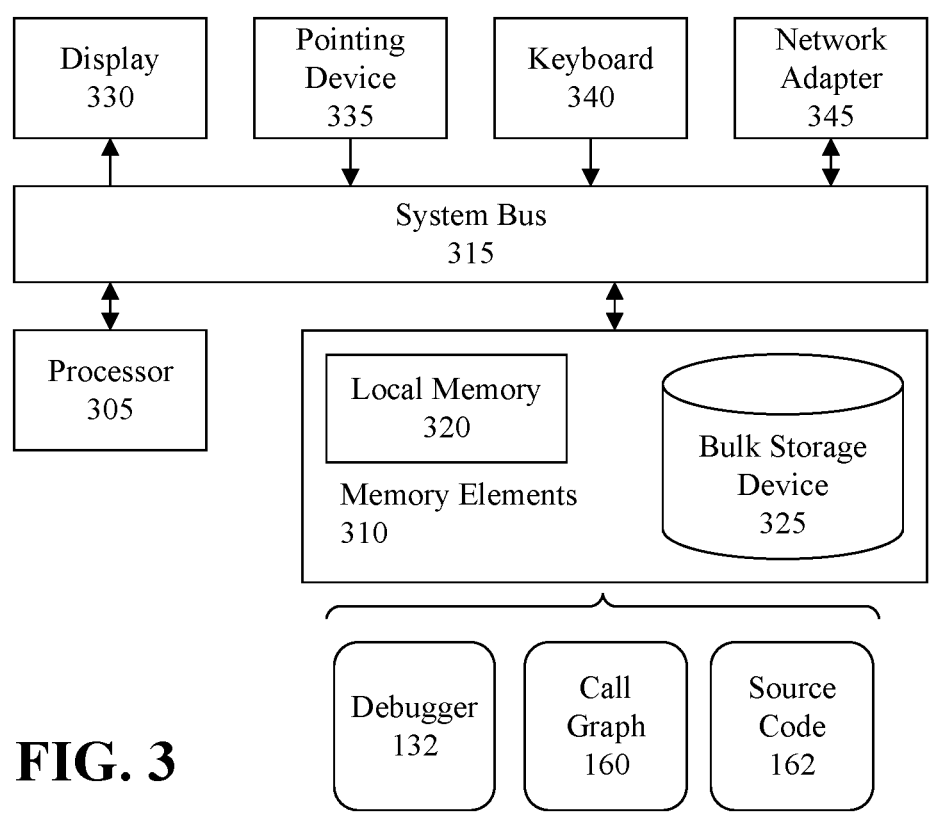
FIG. 3 is a block diagram illustrating example architecture for a data processing system.

FIG. 3 is a block diagram illustrating example architecture for the data processing system 130 of FIG. 1. The data processing system 130 can include at least one processor 305 (e.g., a central processing unit) coupled to memory elements 310 through a system bus 315 or other suitable circuitry. As such, the data processing system 130 can store program code within the memory elements 310. The processor 305 can execute the program code accessed from the memory elements 310 via the system bus 315. It should be appreciated that the data processing system 130 can be implemented in the form of any system including a processor and memory that is capable of performing the functions and/or operations described within this specification. For example, the data processing system 130 can be implemented as a server, a plurality of communicatively linked servers, a workstation, a desktop computer, a mobile computer, a tablet computer, a laptop computer, a netbook computer, and so on.

The memory elements 310 can include one or more physical memory devices such as, for example, local memory 320 and one or more bulk storage devices 325. Local memory 320 refers to random access memory (RAM) or other non-persistent memory device(s) generally used during actual execution of the program code. The bulk storage device(s) 325 can be implemented as a hard disk drive (HDD), solid state drive (SSD), or other persistent data storage device. The data processing system 130 also can include one or more cache memories (not shown) that provide temporary storage of at least some program code in order to reduce the number of times program code must be retrieved from the bulk storage device 325 during execution.

Input/output (I/O) devices such as a display 330, a pointing device 335 and a keyboard 340 can be coupled to the data processing system 130. The I/O devices can be coupled to the data processing system 130 either directly or through intervening I/O controllers. For example, the display 330 can be coupled to the data processing system 130 via a graphics processing unit (GPU), which may be a component of the processor 305 or a discrete device. One or more network adapters 345 also can be coupled to data processing system 130 to enable the data processing system 130 to become coupled to other systems, computer systems, remote printers, and/or remote storage devices through intervening private or public networks. Modems, cable modems, transceivers, and Ethernet cards are examples of different types of network adapters 345 that can be used with the data processing system 130.

As pictured in FIG. 3, the memory elements 310 can store the components of the data processing system 130, namely the debugger 132, the call graph 160 and the source code 162. Being implemented in the form of executable program code, the debugger 132 can be executed by the data processing system 130. Further, being implemented as functional data structures, the call graph 160 and source code 162 can be processed by the data processing system 130. Accordingly, the debugger 132, the call graph 160 and the source code 162 can be considered part of the data processing system 130. Moreover, the debugger 132, call graph 160 and source code 162 impart functionality when employed as part of the data processing system 130.

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," or similar language means that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:

connecting to a processing element of a remotely deployed and live streaming application executed by a first data processing system, the processing element containing at least a first operator that processes at least one tuple;

hooking at least one processing thread of the live streaming application used for execution of the processing element;

as the live streaming application is executed, without slowing or modifying data flow of the live streaming application execution to client devices, receiving a copy of the tuple and a memory dump of first state data for a state of the first operator while operating on the tuple, and tracking the tuple through a call graph comprising a plurality of nodes and a plurality of edges, each node representing a respective operator, and each edge connecting a respective pair of the plurality of nodes and representing a function call between the respective pair of the plurality of nodes;

in a debugger hosted on a second data processing system that is remote to the first data processing system, loading, using a processor, the first state data for the state of the first operator into a local instance of the first operator loaded into the debugger by moving or copying the first state data into at least a first location in memory used by the local instance of the first operator;

presenting, by the debugger, to a user at least a portion of the call graph comprising the plurality of nodes and the plurality of edges, and indicating to the user a flow of the tuple through at least the portion of the call graph based on the state data for the first operator;

receiving, by the debugger, at least a first user input changing the tuple or the state data for the first operator; and receiving, by the debugger, at least a second user input initiating the first operator to perform at least a first operation on the tuple as changed by the first user input or using the state data for the first operator as changed by the first user input, wherein the debugger is configured for the user to inspect a state of the first operator resulting from the at least the first operation performed on the tuple by the first operator in response to the second user input.

2. The method of claim 1, further comprising:
indicating to the user a different flow of the tuple through at least the portion of the call graph resulting from the first user input.

3. The method of claim 2, further comprising:
determining that additional data is required to accurately indicate the different flow of the tuple through at least the portion of the call graph resulting from the first user input; and generating at least one assumption regarding the different flow of the tuple through at least the portion of the call graph;

wherein indicating to the user a flow of the tuple through at least the portion of the call graph further is based on the generated at least one assumption.

4. The method of claim 2, further comprising:
determining that additional data is required to accurately indicate the different flow of the tuple through at least the portion of the call graph resulting from the first user input; and generating at least one assertion regarding the different flow of the tuple through at least the portion of the call graph;

wherein indicating to the user a flow of the tuple through at least the portion of the call graph further is based on the generated at least one assertion.

5. The method of claim 4, wherein the at least one assertion is user selected.

6. The method of claim 1, wherein the debugger performs, using at least the state data for the operator, a reconstruction of at least a portion of the live streaming application containing the first operator that performs the at least the first operation on the at least one tuple.

7. The method of claim 1, wherein the memory dump comprises second state data for a state of at least a second operator while operating on the tuple, the method further comprising:

in the debugger, loading the second state data for the state of the at least the second operator into a local instance of the at least the second operator loaded into the debugger by moving or copying the second state data into at least a second location in memory used by the local instance of the at least the second operator; and receiving, by the debugger, at least a third user input stepping through the call graph and initiating at least the second operator to perform at least a second operation on the tuple, wherein the debugger is configured for the user to inspect a state of the second operator resulting from the at least the second operation performed on the tuple by the second operator in response to the third user input.

8. A system, comprising:
a processor programmed to initiate executable operations comprising:

connecting to a processing element of a remotely deployed and live streaming application executed by a first data processing system, the processing element containing at least a first operator that processes at least one tuple;

hooking at least one processing thread of the live streaming application used for execution of the processing element;

as the live streaming application is executed, without slowing or modifying data flow of the live streaming application execution to client devices, receiving a copy of the tuple and a memory dump of first state data for a state of the first operator while operating on the tuple, and tracking the tuple through a call graph comprising a plurality of nodes and a plurality of edges, each node representing a respective operator, and each edge connecting a respective pair of the plurality of nodes and representing a function call between the respective pair of the plurality of nodes;

in a debugger hosted on a second data processing system that is remote to the first data processing system, loading the first state data for the state of the first operator into a local instance of the first operator loaded into the debugger by moving or copying the first state data into at least a first location in memory used by the local instance of the first operator;

presenting, by the debugger, to a user at least a portion of the call graph comprising the plurality of nodes and the plurality of edges, and indicating to the user a flow of the tuple through at least the portion of the call graph based on the state data for the first operator;

receiving, by the debugger, at least a first user input changing the tuple or the state data for the first operator; and receiving, by the debugger, at least a second user input initiating the first operator to perform at least a first operation on the tuple as changed by the first user input or using the state data for the first operator as changed by the first user input, wherein the debugger is configured for the user to inspect a state of the first operator resulting from the at least the first operation performed on the tuple by the first operator in response to the second user input.

9. The system of claim 8, the executable operations further comprising:
indicating to the user a different flow of the tuple through at least the portion of the call graph resulting from the first user input.

10. The system of claim 9, the executable operations further comprising:
determining that additional data is required to accurately indicate the different flow of the tuple through at least the portion of the call graph resulting from the first user input; and generating at least one assumption regarding the different flow of the tuple through at least the portion of the call graph;

wherein indicating to the user a flow of the tuple through at least the portion of the call graph further is based on the generated at least one assumption.

11. The system of claim 9, the executable operations further comprising:
determining that additional data is required to accurately indicate the different flow of the tuple through at least the portion of the call graph resulting from the second first user input; and generating at least one assertion regarding the different flow of the tuple through at least the portion of the call graph;

wherein indicating to the user a flow of the tuple through at least the portion of the call graph further is based on the generated at least one assertion.

12. The system of claim 11, wherein the at least one assertion is user selected.

13. The system of claim 8, wherein the debugger performs, using at least the state data for the operator, a reconstruction of at least a portion of the live streaming application containing the first operator that performs the at least the first operation on the at least one tuple.

14. The system of claim 8, wherein the memory dump comprises second state data for a state of at least a second operator while operating on the tuple, the executable operations further comprising:

in the debugger, loading the second state data for the state of the at least the second operator into a local instance of the at least the second operator loaded into the debugger by moving or copying the second state data into at least a second location in memory used by the local instance of the at least the second operator; and receiving, by the debugger, at least a third user input stepping through the call graph and initiating at least the second operator to perform at least a second operation on the tuple, wherein the debugger is configured for the user to inspect a state of the second operator resulting from the at least the second operation performed on the tuple by the second operator in response to the third user input.

15. A computer program product comprising a computer readable storage medium having program code stored thereon, the program code executable by a processor to perform a method comprising:

connecting, by the processor, to a processing element of a remotely deployed and live streaming application executed by a first data processing system, the processing element containing at least a first operator that processes at least one tuple;

hooking, by the processor, at least one processing thread of the live streaming application used for execution of the processing element;

as the live streaming application is executed, without slowing or modifying data flow of the live streaming application execution to client devices, receiving, by the processor, a copy of the tuple and a memory dump of first state data for a state of the first operator while operating on the tuple, and tracking the tuple through a call graph comprising a plurality of nodes and a plurality of edges, each node representing a respective operator, and each edge connecting a respective pair of the plurality of nodes and representing a function call between the respective pair of the plurality of nodes;

in a debugger hosted on a second data processing system that is remote to the first data processing system, loading, by the processor, the first state data for the state of the first operator into a local instance of the first operator loaded into the debugger by moving or copying the first state data into at least a first location in memory used by the local instance of the first operator;

presenting, by the debugger, to a user at least a portion of the call graph comprising the plurality of nodes and the plurality of edges, and indicating to the user a flow of the tuple through at least the portion of the call graph based on the state data for the first operator;

receiving, by the debugger, at least a first user input changing the tuple or the state data for the first operator; and receiving, by the debugger, at least a second user input initiating the first operator to perform at least a first operation on the tuple as changed by the first user input or using the state data for the first operator as changed by the first user input, wherein the debugger is configured for the user to inspect a state of the first operator resulting from the at least the first operation performed on the tuple by the first operator in response to the second user input.

16. The computer program product of claim 15, the method further comprising:

indicating to the user a different flow of the tuple through at least the portion of the call graph resulting from the first user input.

17. The computer program product of claim 16, the method further comprising:

determining that additional data is required to accurately indicate the different flow of the tuple through at least the portion of the call graph resulting from the first user input; and generating at least one assumption regarding the different flow of the tuple through at least the portion of the call graph;

wherein indicating to the user a flow of the tuple through at least the portion of the call graph further is based on the generated at least one assumption.

18. The computer program product of claim 16, the method further comprising:

determining that additional data is required to accurately indicate the different flow of the tuple through at least the portion of the call graph resulting from the first user input; and generating at least one assertion regarding the different flow of the tuple through at least the portion of the call graph;

wherein indicating to the user a flow of the tuple through at least the portion of the call graph further is based on the generated at least one assertion.

19. The computer program product of claim 15, wherein the debugger performs, using at least the state data for the operator, a reconstruction of at least a portion of the live streaming application containing the first operator that performs the at least the first operation on the at least one tuple.

20. The computer program product of claim 15, wherein the memory dump comprises second state data for a state of at least a second operator while operating on the tuple, the method further comprising:

in the debugger, loading the second state data for the state of the at least the second operator into a local instance of the at least the second operator loaded into the debugger by moving or copying the second state data into at least a second location in memory used by the local instance of the at least the second operator; and receiving, by the debugger, at least a third user input stepping through the call graph and initiating at least the second operator to perform at least a second operation on the tuple, wherein the debugger is configured for the user to inspect a state of the second operator resulting from the at least the second operation performed on the tuple by the second operator in response to the third user input.

* * * * *